(12) United States Patent
Cranston et al.

(10) Patent No.: US 6,430,636 B1
(45) Date of Patent: Aug. 6, 2002

(54) METHOD AND SYSTEM FOR A PHYSICAL BUS SELECTOR

(75) Inventors: Michael T. Cranston, Arlington Heights; Steven R. Brown, Buffalo Grove, both of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/290,596

(22) Filed: Apr. 13, 1999

Related U.S. Application Data

(63) Continuation of application No. 09/218,330, filed on Dec. 22, 1998, now Pat. No. 6,253,269.

(51) Int. Cl.[7] .............................................. G06F 13/00
(52) U.S. Cl. ...................................................... 710/107
(58) Field of Search ................................. 710/107–125, 710/305; 370/362–364, 395.7–395.72

(56) References Cited

U.S. PATENT DOCUMENTS

| | | | | |
|---|---|---|---|---|
| 5,122,691 A | * | 6/1992 | Balakrishnan | 326/86 |
| 5,386,466 A | * | 1/1995 | Bales et al. | 379/220 |
| 5,949,785 A | * | 9/1999 | Beasley | 370/398 |
| 6,154,465 A | * | 11/2000 | Pickett | 370/466 |

* cited by examiner

*Primary Examiner*—Sumati Lefkowitz
(74) *Attorney, Agent, or Firm*—McDonnell Boehnen Hulbert & Berghoff

(57) ABSTRACT

A communication interface device with a card chassis capable of holding a number of electronic equipment or circuit cards. The card chassis provides a communication backplane that provides a plurality of communication buses accessing each of the equipment cards in the card chassis. To select between communication buses with mutually exclusive access to the electronic circuit card, an arbiter monitors the communication buses and determines which of the plurality of communication bus will be provided access to the electronic circuit card.

16 Claims, 10 Drawing Sheets

WRITE TRANSATION STATE MACHINE FLOW CHART

A stop signal on either I²C bus will reset the Control State Machine

METHOD AND SYSTEM FOR A PHYSICAL BUS SELECTOR

STATEMENT OF RELATED APPLICATION

This application claims the benefit under 35 U.S.C. §120 and is a continuation of U.S. patent application Ser. No. 09/218,330, filed Dec. 22, 1998, now U.S. Pat. No. 6,254, 269 entitled "Method and System For a Bus Arbiter" for all common subject matter disclosed therein.

FIELD OF INVENTION

This invention relates in general to communications equipment. More particularly, it is directed to providing a communication device with the ability to switch or arbitrate between a plurality of communication buses.

BACKGROUND OF THE INVENTION

An electronic card chassis typically provides a plurality of card slots for inserting electronic equipment or application cards. Typically, these application cards are designed to perform a variety of communication functions such as providing a modem card or other communication interface card capability. In addition to application cards capable of performing a variety of communication functions, the electronic card chassis may also contain a management card to perform system overhead management functions for the application cards in the chassis.

In the electronic card chassis, a communication backplane provides the application cards a source of power and communication access to other application cards in the card chassis. The communication backplane may include a plurality of different communication buses to allow electronic circuit cards in the card chassis to communicate to external devices or to other cards in the card chassis.

In particular embodiments of an electronic card chassis, a dedicated communication bus allows the management card to communicate to the plurality of application cards. This management communication bus provides management cards a dedicated communication path to access each of the application cards in the card chassis.

Today, digital computer networks implemented using these types of electronic card chassises are carrying a larger amount of communications including data and voice. Increasingly critical applications such as banking financial transactions now use this type of equipment to implement communication. Thus, the need for reliability and fault tolerant equipment has increased. To provide for fault tolerant operation, the card chassis may include a number of management cards for backup and redundancy in case of a failure of a primary management card. If a primary management card were to experience a failure, a second or backup management card could take over the management function of the application cards in the electronic card chassis. Similarly, the card chassis may provide a plurality of redundant management communication buses in the case of failure of a communication bus.

In this redundant configuration including a plurality of management cards, each of the plurality of management cards will typically have a backplane communication bus connection to each of the application cards. As a result of the plurality of management cards and the redundant communication buses, each application card will have a plurality of backplane communication buses from which it may receive communications from the management cards at any time. As a consequence, the application card must be capable of receiving messages from any of the management cards over any one of the backplane communication buses accessing the card. Thus, to properly receive incoming management messages from any of the management cards, the application card must be able to dynamically switch between different backplane communication buses.

SUMMARY OF THE INVENTION

In accordance with an illustrative embodiment of the present invention, problems associated with managing communications from a plurality of different communication buses are addressed. The present embodiment allows application cards to arbitrate between messages on a plurality of different communication buses from devices communicating to the application card.

According an embodiment of the invention, application cards may arbitrate between messages on a plurality of different communication buses from devices communicating to the application card.

In the illustrative embodiment, the application card includes an arbiter that monitors the plurality of communication buses to determine which communication bus is current accessing the application card. To this end, the arbiter monitors when a communication bus becomes active. When it detects a communication bus is active and no other mutually exclusive bus is active, the arbiter will allow that communication bus to access the application card. The communication bus can be switched to access the local bus of the application card. Once a communication bus is allowed access to the communication card, a hold off signal may be given to other communication buses accessing the application card. In addition, a timer may be utilized with the present embodiment to prevent a device from holding the communication bus to the application card for too long a period of time. It should be understood that the application card may be simultaneously accessed by a number of communication buses while other communication buses utilize mutually exclusive (one-at-a-time) access to the application card.

According to another aspect of the present invention, the arbiter allows the application card to dynamically select or arbitrate between different communication buses. The arbiter may include state machine logic to implement appropriate protocol of the communication bus. The arbiter can employ a variety of different algorithms to allow and control access to the application card. The arbiter may allow access to the application card according to the priority of different communication buses. The arbiter can allow simultaneous access to the application card according to the types and classes of different communication buses. Using the present invention, any arbitrary scheme for selecting among a plurality of communication buses may be implemented and dynamically tailored and changed according to the needs of the particular device.

In another illustrative embodiment, the application card includes a physical layer interface capable of switching between redundant physical buses providing communication to the application cards. To provide fault-tolerant operation, the equipment card chassis in this embodiment provides a plurality of redundant physical buses to carry information to the application cards. The redundant physical buses provide backup capability for fault-tolerant operation in the case of failure of a physical bus. During such a failure, the application card may switch from one physical bus to another backup redundant bus. In the illustrative embodiment, the physical bus is a 10-Base-2 Ethernet bus that is dedicated for carrying management information to application cards in an equipment card chassis. The 10-base-2 bus includes redundant physical buses.

According to another aspect of the invention, a physical layer bus interface switches the active physical bus between redundant physical buses according to a dynamic criterion. In an embodiment of the invention, a second bus carries the criterion that indicates the currently active physical bus communicating to the application card. In the exemplary embodiment, the second bus is utilized to carry a criterion bit that determines the active physical bus. An expander breaks out the criterion bit to the physical layer bus interface to switch the appropriate physical bus. Based on the criterion, physical interface switch selects the appropriate physical bus.

The described embodiments provide devices and methods enabling reliable fault tolerant communication platforms. The ability to automatically select between redundant hardware and software allows backup equipment to be provided and dynamically utilized as needed without taking the platform out of service. The foregoing and other features and advantages of an illustrative embodiment of the present invention will be more readily apparent from the following detailed description, which proceeds with references to the accompanying drawings.

DETAILED DESCRIPTION OF AN ILLUSTRATIVE EMBODIMENT

Figure 1:
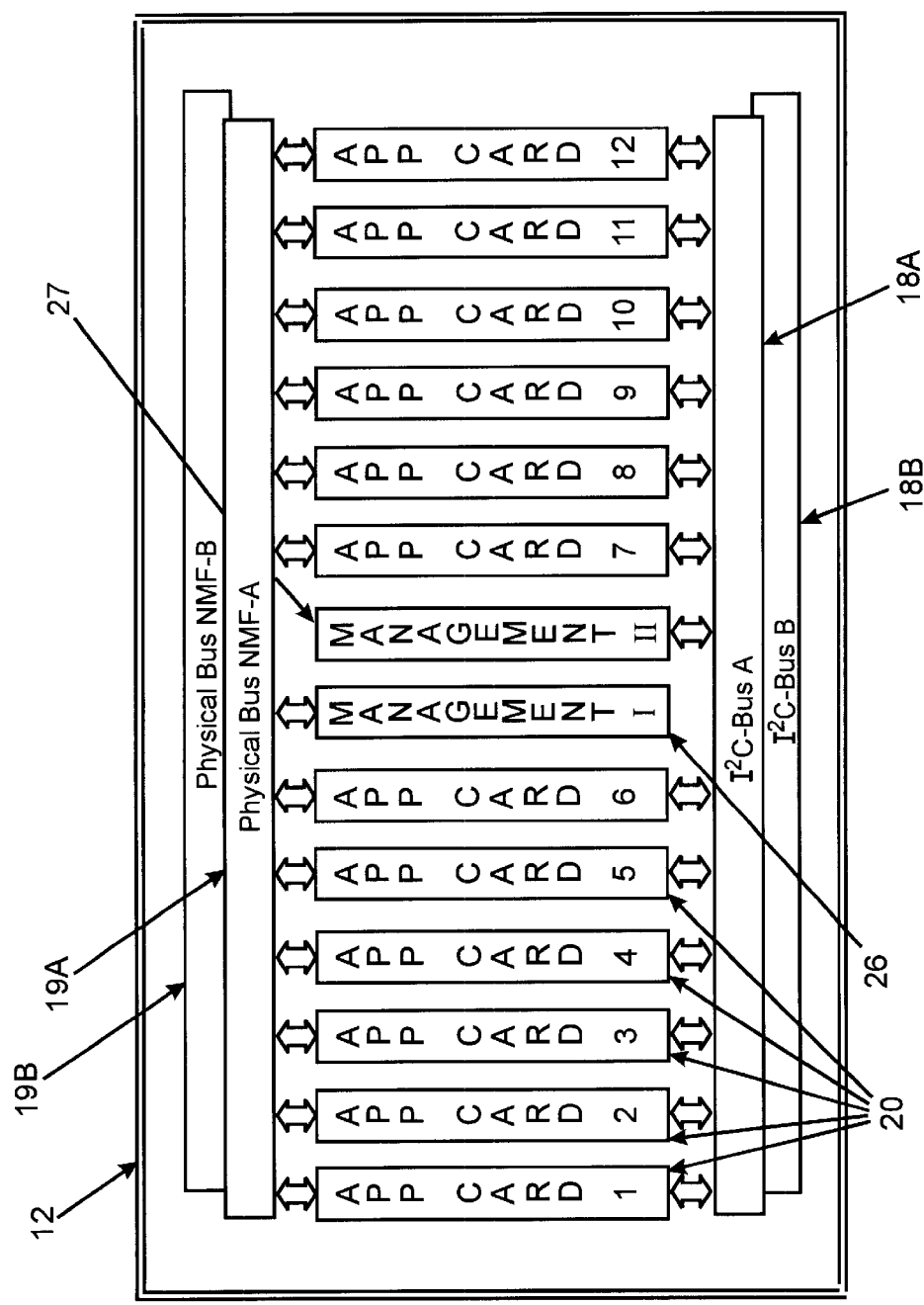
FIG. 1 shows a simplified block diagram illustrating a system embodying an exemplary embodiment of the present invention.

FIG. 1 diagrammatically illustrates a simplified example of an electronic equipment card chassis 12 utilizing an illustrative embodiment of the invention. The exemplary system, includes a card chassis 12 utilized in a communication interface device such as a network access server ("NAS"), remote access server ("RAS"), router, bridge, gateway or other type of suitable communication device.

In the illustrative embodiment, the card chassis 12 provides a plurality of available card slots (not shown) capable of holding a plurality of electronic circuit or application cards 20 that may perform a variety of different functions.

The card chassis 12 provides the facility to provide a backplane having a plurality of communication buses for the application equipment cards 20 contained in the card chassis 12 to communicate with other application equipment cards 20 in the card chassis 12. To facilitate communications between the different application cards 20 in the card chassis, a plurality of different types of communication buses provide communication access and coordination between the different application cards 1–12 in the card chassis. This illustrative embodiment will be described with respect to an implementation using an $I^2C$-bus to provide communication for a management card implementing a variety of management functions for the different cards in the chassis 12.

Although the exemplary embodiment described herein is in relation to management cards communicating to application cards over a particular type of bus using a particular communication protocol. It should be understood that the present embodiment can be applied to any type of communication buses which require arbitration between a plurality of buses. For example, a card chassis 12 may also include an Asynchronous Transfer Mode ("ATM") bus or Star bus to handle data call type traffic between modems and the Switch Fabric/Management Card 26, as well as voice-data call setup over a TDM bus. The card chassis may also include two separate ATM buses to provide back up for fault tolerant operation that can be arbitrated between the two buses as taught herein. It should be understood that additional buses or fewer buses than described herein may be provided.

In this preferred embodiment, the Switch Fabric/Management Card 26 oversees the operation of all the components in the card chassis. The Switch Fabric/Management card 26 may provide a variety of system management functions of the card chassis 12 such as software download to the various application cards upon power up, the operational configuration of the application cards, and providing card status and statistics. An $I^2C$-bus 18a may also be provided for Switch Fabric/Management Card 26 to communicate control and management functions of the application cards 20. To provide for fault tolerant operation, a plurality of redundant Switch Fabric/Management Cards 26 and associated $I^2C$-bus may be provided.

The Inter-IC bus or $I^2C$-bus in this exemplary embodiment is generally designed to connect a number of integrated circuit ("ICs") devices. The $I^2C$-bus is a multi-master bus, meaning that a plurality of devices, such as ICs, can be connected to the bus, and each of the devices may act as the master of the bus by taking control of the bus to initiate a data transfer. According to the $I^2C$-bus standard, a device that transmits signals onto the $I^2C$-bus is the "transmitter." A device that controls signal transfers on the bus in addition to controlling the clock frequency of the bus is the "master." A device that receives signals from the bus is the receiver and a device that is controlled by the master is a "slave." The master device can transmit or receive signals to or from a slave device, respectively, or control signal transfers between two slave devices, where one slave device is the transmitter and the other slave device is the receiver. It is also possible to combine multiple master devices and multiple slave devices, onto an $I^2C$-bus to form a multi-master system. In this multi-master system, if more than one master device simultaneously attempts to control the line a conflict arises and an arbitration procedure must decide which master device gets priority.

In addition to communication conflicts over a single bus, multiple $I^2C$-buses accessing the same application card may also potentially conflict. In some systems, several $I^2C$-buses may exist for redundancy and fault tolerant operation. As previously described, a card chassis holding a number of application cards may include a management card such as Switch Fabric/Management Card 26 to control the operation of the card chassis and application cards within the chassis. To provide for fault tolerant operation, a plurality of management cards may be provided for backup and redundancy. Each of the management cards will have its own communication bus access to each application card. These redundant management communication buses, however, should have mutually exclusive data communication access to the application card to avoid conflicts and contention between multiple devices.

Figure 2:
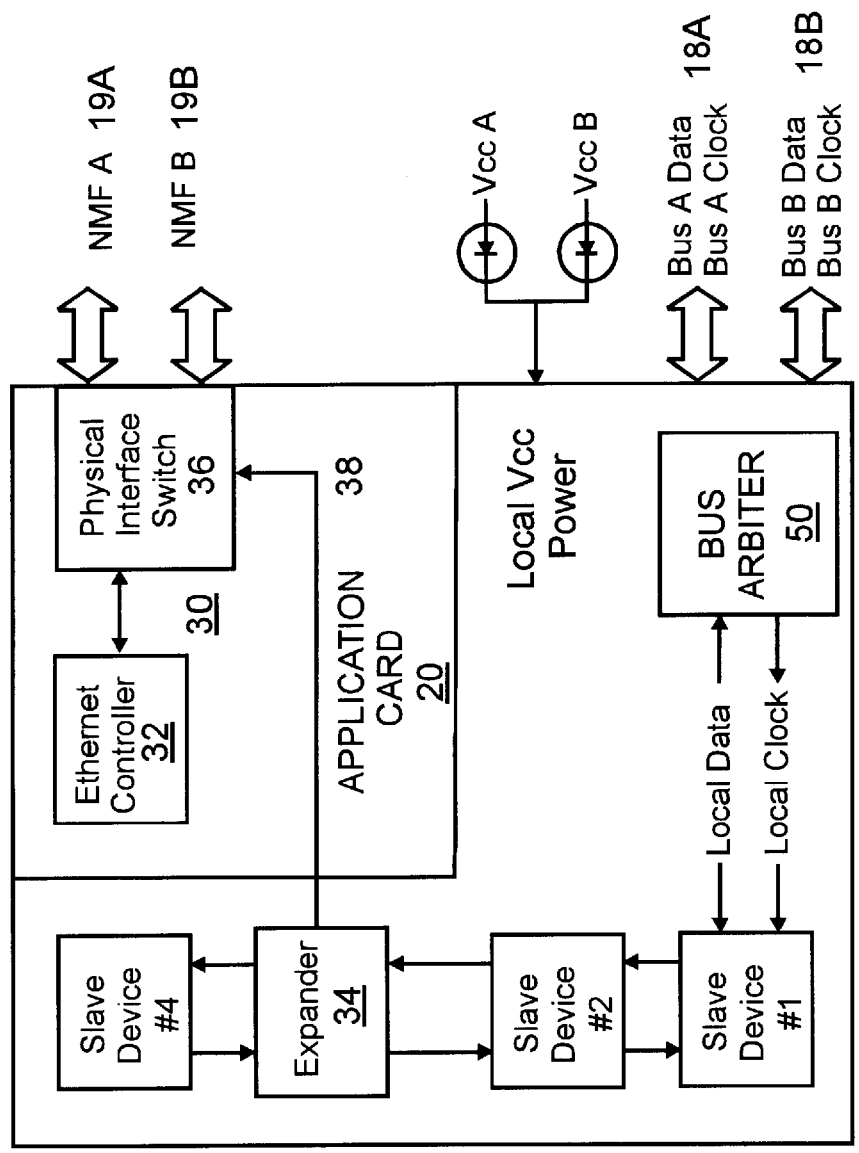
FIG. 2 shows a simplified block diagram illustrating an application card in the system of FIG. 1.

Referring again to FIG. 1, in this exemplary implementation a primary or first management card 26 and a second management card 27 may be provided for redundancy in the case of a failure of the first management card 26. Each of these management cards 26, 27 preferably has their own communication bus shown as separate I$^2$C-buses 18a, 18b to communicate to each application card in card slots 1–12 of the card chassis 12. The card chassis 12 backplane will provide I$^2$C-bus connections 18a, 18b from each of the management card slots to each of the application card slots. FIG. 1 diagrammatically shows the I$^2$C-buses 18a, 18b as a series of connections between each of the management cards 26, 27 and the card slots 1–12. As seen in FIG. 2, an application card in each of the card slots 1–12 will therefore have two management communication buses 18a, 18b, one from each of the management cards 26, 27, accessing each card slot.

At any time, either of the management cards 26, 27 may initiate a communication or data transfer over its I$^2$C-bus to an application card using an I$^2$C-bus Start Sequence as described in more detail below. As a result, the application card receiving commands from the management cards via the I$^2$C-buses 18a, 18b must be able to dynamically switch between the two I$^2$C-bus interfaces to receive the data transfer. To select between the I$^2$C-buses, the application cards preferably include an arbiter that provides an interface to the I$^2$C-buses accessing the card and appropriately allows the active communication bus to access the application card.

In another embodiment of the invention, the electronic equipment card chassis also includes redundant buses 19A, 19B for carrying certain management information traffic from the management cards 26, 27 to the application cards 20. In this exemplary embodiment, the physical buses are implemented as 10Base-2 Ethernet buses but it should be understood that other types of communication buses may also be used. In this embodiment, management information traffic carried by physical buses 19A, 19B includes software download to the application cards, card configuration, card status and card statistics, etc. For example, the 10-Base-2 buses NMF-A, NMF-B are utilize to download management information such as operation code and configuration parameters from the management cards 26, 27 to the application cards 20.

Referring now to FIG. 2, shown is a diagrammatic illustration of an application card 20 with an arbiter 50 that may be utilized to interface a plurality of incoming communication buses to the application card 20. The arbiter 50 also preferably implements and provides the selection between the plurality of mutually exclusive communication buses 18a, 18b having communication access to the application card 20. The active communication bus carrying communications for the application card will access the devices on the application card through a local bus (Local Data and Local Clock), which may also include an I$^2$C-bus. As shown in the example of FIG. 2, a plurality of communication buses, Bus A and Bus B 18a, 18b in this example, access the application card 20. Thus, the application card 20 may receive messages from either of the communication buses, Bus A or B. The arbiter 50 determines which of the communication buses 18a, 18b the application card 20 (at Local Card Data and Local Card Clock) will receive messages from using methods described in more detail below. Once the selection of the active incoming communication bus is made, the selected communication bus and data is allowed to access the application card on the Local Card Data and Local Card Clock. The Local Data and Local Card may access a variety of devices on the application card 20, such as the Slave devices 1–4 shown in FIG. 2.

It should also be noted that the power source, Vcc for the application card can be supplied from a 3.3V supply line from the management card 26 to ensure the Hardware Network Management (HNM) is active even if the main power of the application card itself is turned off. Preferably, the arbiter 50 draws power from two supply pins on the backplane driven by management cards 26, 27. The supply pins are OR'ed on the application card and then fused (not shown). In a preferred embodiment, the application card is limited to drawing 200 mA. The combination of the power supplies from different sources, the two management cards in this example, provides redundancy in the case of failure of a power supply.

The arbiter 50 provides an interface to the communication buses 18a, 18b, and acts as a bi-directional multiplexer selecting which of the plurality of communication buses will be allowed access to the Local Card Data and Clock bus of the application card. A bus interface typically includes an interface to the communication bus according to the standards and requirements of the particular type of communication bus being interfaced. In this example, the interface requirements of the I$^2$C-bus are published by Philips Semiconductors and widely known and available. Of course, the arbiter 50 can be interfaced to a variety of other bus interfaces as well. Preferably, the arbiter 50 incorporates most of the basic I$^2$C-bus protocols which allows it to monitor transactions on the bus and switch direction of the bus when appropriate. More details regarding particular I$^2$C-bus protocols will be provided below. Preferably, the operation of the arbiter 50 is transparent to the transactions on the buses. In the preferred embodiment, the arbiter does not have an I$^2$C-bus address and is not directly accessible from the switch management card.

Also shown in FIG. 2 is a physical layer bus interface 30 to interface the physical buses 19A, 19B carrying management information traffic to the application card 20. As seen in FIG. 2, the physical layer bus interface 30 can be implemented on an application card 20 using an Ethernet bus controller 32, an expander 34 and physical interface switch 36 connected to redundant physical buses NMF-A, NMF-B. As described above, the redundant physical buses in this example, now referred to as NMF-A NMF-B, are implemented using 10Base-2 Ethernet buses, but other types of interface buses may also be used in other embodiments. The physical interface switch 36 switches between a plurality of different physical buses and connects the appropriate physical bus NMF-A NMF-B to the Ethernet controller 32 to provide the management card 26 access to the application card 20. The physical interface 36 can be implemented in a number of ways including using electronic relays or an analog switch.

In this embodiment, the expander 34 provides criterion 38 to the physical interface switch 36 such that the physical interface switch can determine the proper physical bus 19A, 19B to connect to the Ethernet controller to provide communication access to the application card 20. The expander 34 in this embodiment is preferably an 8-bit expander implemented as a GPIO (General Purpose Input/Output) type device on the I²C-bus. FIG. 2 shows the expander 34 as an I²C slave device. Preferably, the expander 34 has an output such as a data register capable of providing the criterion 38. Based on the criterion 38 provided by the expander 34, the physical interface switch 36 connects the appropriate physical layer bus 19A, 19B to the Ethernet controller 32.

For example, when an application card 20 is first inserted into an equipment card chassis 12, the card 20 is powered up and may require software or operational configuration be downloaded from the management card 26 (FIG. 1). To download management information from the management card 26, the application card should first determine which of the redundant 10Base-2 Ethernet buses 19A, 19B will be utilized for communication of management information. According to the present embodiment, the physical interface switch 36 determines the appropriate 10Base-2 Ethernet bus 19A, 19B according to the criterion or criteria 38, a single bit flag in this embodiment. To determine which of the redundant buses an application card 20 will use to communicate management data, the physical layer bus interface 30 checks a criteria 38 or a bit flag value to determine which of the redundant physical buses NMF-A or NMF-B to utilize. In addition, if one of the 10-base-2 buses were to go out of service with a fault, then all the equipment cards in the chassis should be instructed to switch to the proper active physical bus 19A, 19B according to the criterion bit. In this situation, one criterion value may indicate the active physical bus to be NMH-A and another criterion value may indicate the current active physical bus to be NMF-B.

In this embodiment of the invention, the criterion 38 is a single bit flag carried by the I²C-bus 18 to each of the application cards 20 in the equipment card chassis 12. The management card 26 determines the currently active physical bus NMF-A or NMF-B and accordingly sets the criterion bit 38 on the I²C-bus 18 to instruct application cards 20 as the proper physical bus for the application card 20 to receive management instructions. The I²C-bus 18 carries the criterion bit 38 to the application cards, where the criterion bit 38 is received by the bus expander (The operation of the I²C-bus and bus arbiter is described in more detail herein with reference to FIG. 3). In other embodiments, the criterion may take other forms such as a word byte, a settable hardware switch(es), a programmable register. Although the criterion 38 in this embodiment is delivered to the application card using an I²C-bus, it can also be delivered to the application cards in a variety of different other ways, using different types of communication schemes.

Using the physical layer bus interface 30, redundant physical communication buses can be utilized to provide reliable, fault tolerant operation. Although the illustrative embodiment describes implementing management communication buses in an equipment card chassis, it should be understood that the embodiments have applications in other applications and environments.

Figure 3:
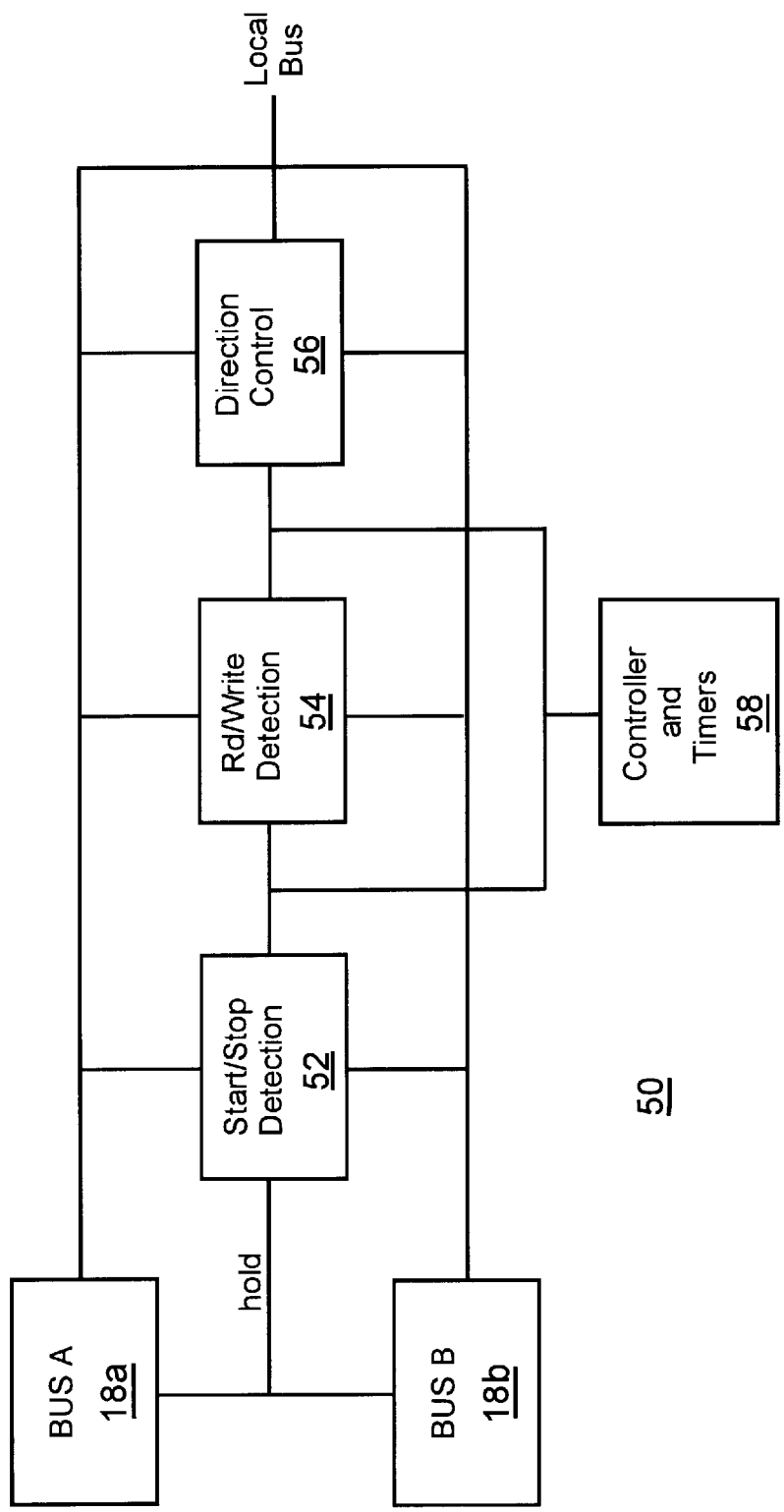
FIG. 3 shows an illustrative embodiment of the bus arbiter in the application card of FIG. 2.

Referring now to FIG. 3, shown is a hardware embodiment of the Bus Arbiter 50 interfacing a plurality of communication buses, Bus A and Bus B in this example. The exemplary embodiment of the Bus Arbiter 50 employs state machines that are clocked by the external 10 MHz oscillator including Start/Stop Detection 52, Read/Write Detection 54 and Direction Control 56 controlling access from the communication buses to a local bus. Associated controllers and timers 58 are also shown. The Start/Stop Detection state machine 52 monitors for a start condition on either communication bus. An I²C-bus implements a particular Start Sequence that indicate the communication bus is active and ready to initiate a transaction. A particular Start Sequence of the I²C-bus protocol as well as a Stop Sequence of the I²C-bus is described below in more detail with reference to FIGS. 7A and 7B. Once an active communication bus determined by matching the Start Sequence, an internal multiplexer connects the active communication bus to the local application card bus. The other, non-active communication buses are held off. Any signaling on the other communication buses (except for a Stop Sequence) is ignored until the transaction on the current communication bus is completed. Preferably, a Stop Sequence on any communication bus, however, will be received and reset the arbiter 50, terminating the ongoing transactions on either communication bus. The ability of a Stop Sequence from any of the plurality of communication buses to terminate read and write transactions on any active bus provides a mechanism to recover from a failed communication and reset the system as described in more detail below.

Figure 4:
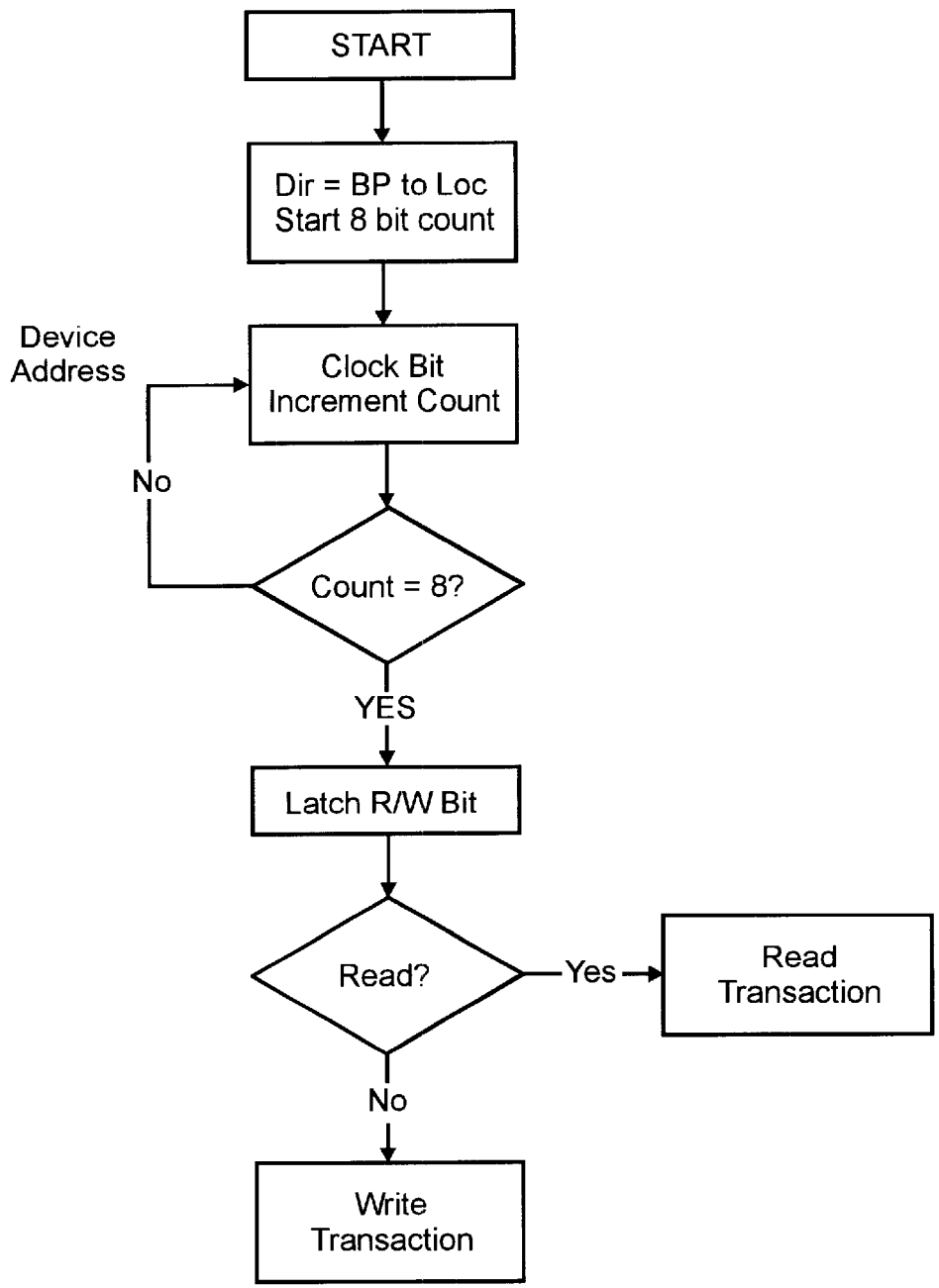
FIG. 4 shows an illustrative embodiment of a flow chart of a control device of the bus arbiter of FIG. 3.

A Control State machine 56 implements the basic I²C protocol decoding the address phase of the protocol to determine if the transaction will be a read or write transaction. The bus arbiter 50 switches direction of the communication bus appropriately for the acknowledge handshaking between the master and slave I²C-bus devices on the bus according to the appropriate protocol. The flowchart of FIG. 4 further explains the logic of an exemplary Control State machine 56 used to determine a read transaction or a write transaction on the bus. The flowchart of FIG. 4 can be implemented by those skilled in the art as a hardware state machine to determine between a read or write transaction.

Figure 5A:
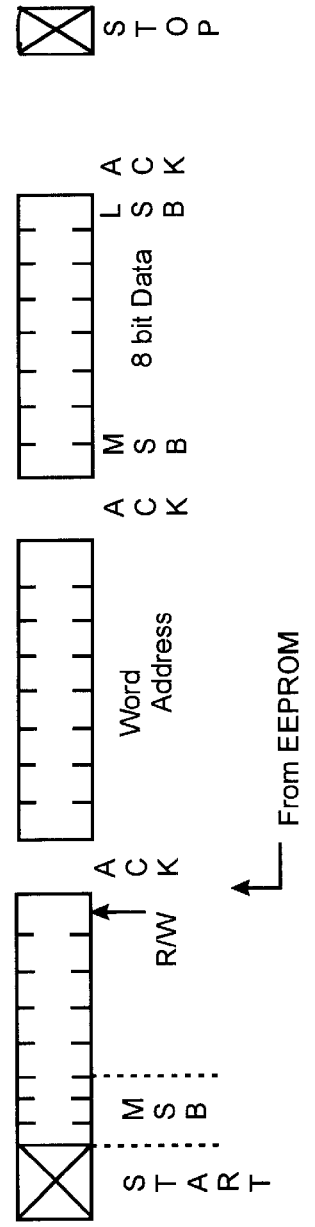
FIGS. 5A and 5B show the Read and Write transactions of an exemplary protocols used in the system of FIG. 1.
Figure 5B:
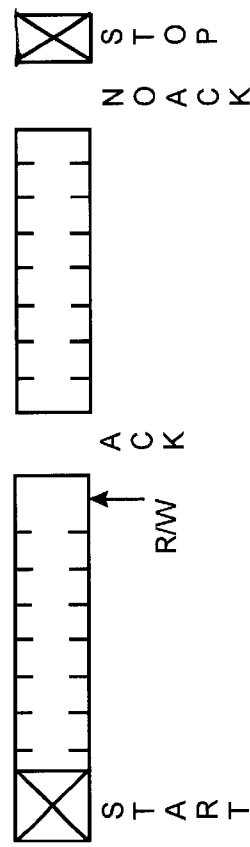
Figure 5B:
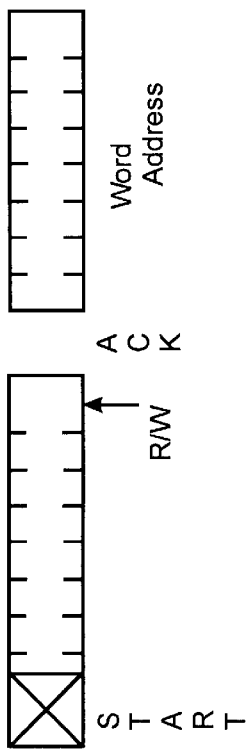
Figure 6A:
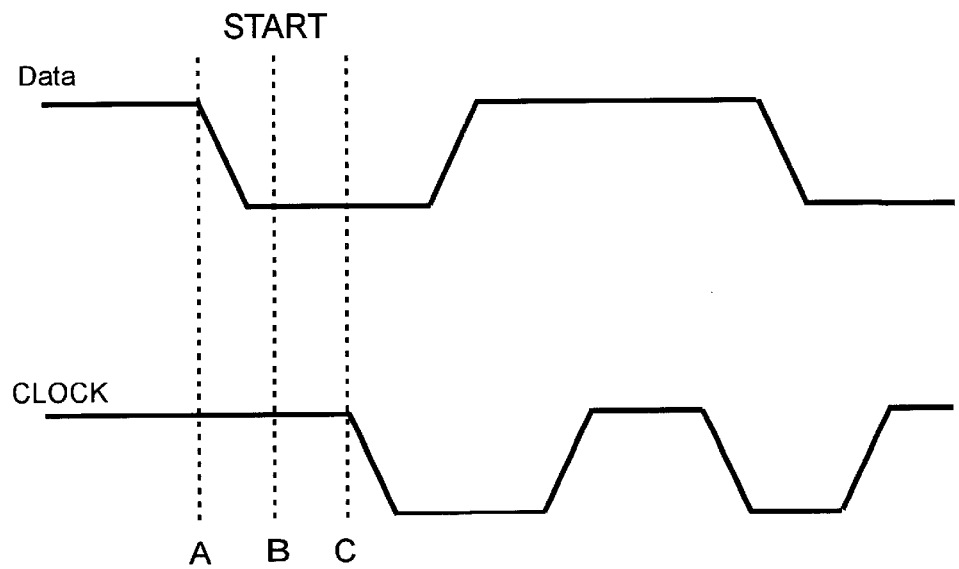
FIGS. 6A and 6B show Start and Stop Sequences of the arbiter of FIG. 3 utilizing an exemplary protocol.
Figure 6B:
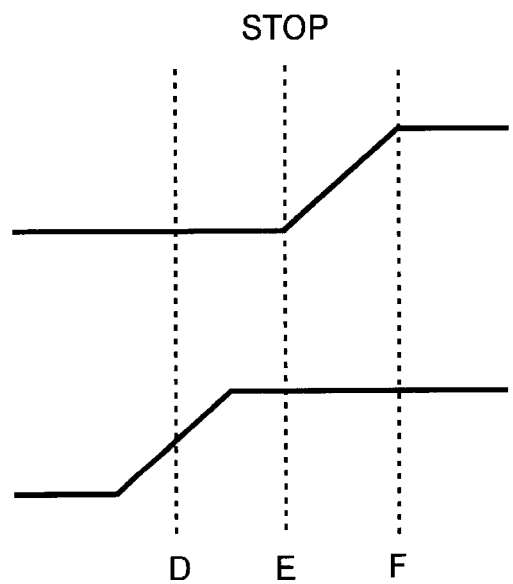

The I²C-bus read and write protocols of the preferred embodiment are shown in FIGS. 5A and 5B. As seen in FIGS. 5A and 5B the read and write transactions are both initiated with a Start Sequence or Start Condition which is described in more detail below (An exemplary Start Sequence is shown in FIG. 6A and described below in more detail). The three most significant bits of a write transaction begin with 3-bit device address and the $8^{th}$ bit a read/write bit indicating the type of transaction. An ACK follows the read/write bit followed by a word address. Following the word address is another ACK and then the data bits are transmitted, most significant bits first. Read transactions progress similarly as shown in FIG. 6B. Both transactions are terminated by a Stop Sequence or Stop Condition on any of the communication buses, as shown in FIG. 6B.

The Start/Stop Detection state machine 52 implements logic and circuitry to detect the Start/Stop sequence protocol as shown in FIGS. 6A and 6B. As shown in FIGS. 6A and 6B, in the illustrative embodiment using the I²C-bus, the I²C protocol specifies a transaction sequence for the start/stop detection of I²C-bus transactions. The protocol examines the Data and Clock lines to determine the status of the bus transaction. On and the inactive bus, the Data and Clock lines with both be in the high logic states as shown at interval A. To indicate the start sequence of the bus, the Data line transitions to the low logic state such that the Data line is low and Clock line is still high, as shown as interval B. The Clock line then transitions to the low logic level as data transmission occurs at interval C. The stop sequence occurs when the Clock line starts high and the Data line is low and begins to transition high at interval D. After the Clock line is high, the Data line starts high at interval E. The Data and Clock lines are then interval F, signifying the Stop sequence.

Using the Start and Stop sequence of the I²C-bus protocol, the arbiter can be programmed to identify active communication buses, determine a failed communication bus and allow access to a backup communication bus. For example, in one embodiment a timeout is initiated upon the detection of a Start sequence as described in FIG. 4 above and terminated upon the detection of a Stop sequence. If a Stop sequence is not detected within a prescribed timeout period, the present communication bus may be assumed to be locked up, failed or otherwise gone out-of-service. The prescribed timeout should be chosen according to the requirements of the particular communication bus protocol, in this case the I²C-bus protocol.

Figure 7A:
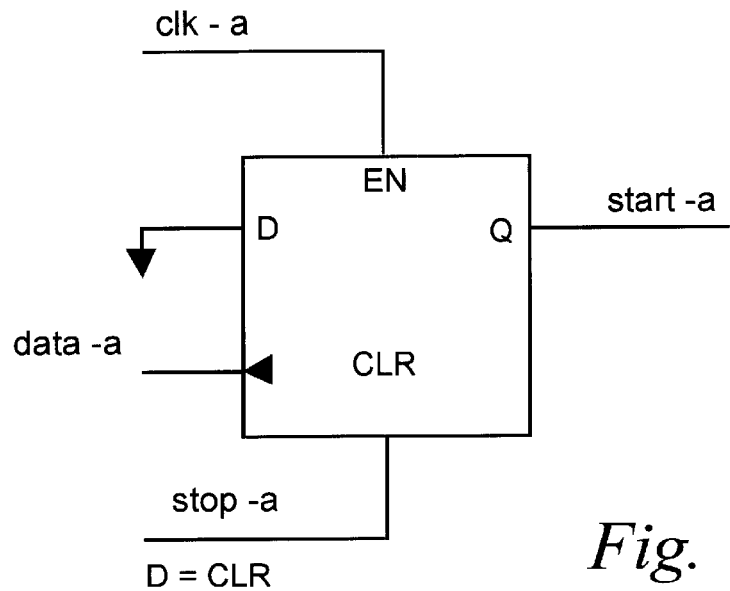
FIGS. 7A and 7B show and exemplary embodiment of hardware utilized to detect Start and Stop Sequences of FIGS. 6A and 6B.
Figure 7B:
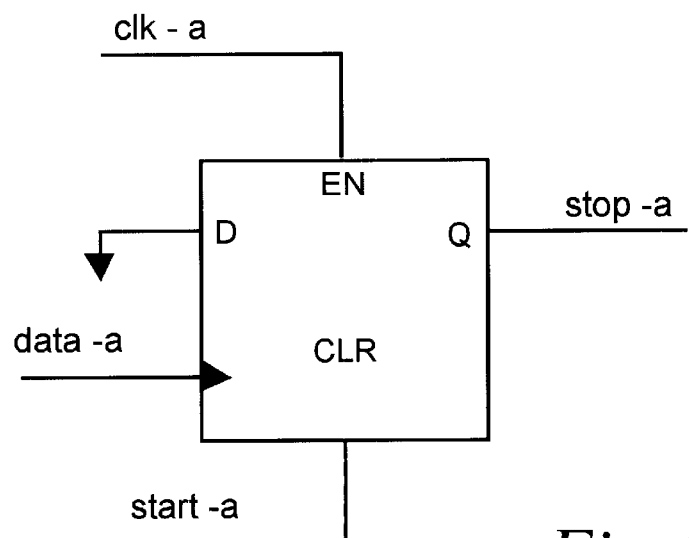

FIGS. 7A and 7B show an illustrative embodiment of Start/Stop Detection state machine logic 52 that can be used to detect the Start and Stop Sequences of the read and write transactions of FIGS. 6A and 6B. The Start/Stop detections can implemented with flip-flops that can be including ordinary combinational logic well-known by those skilled in the art.

Figure 8:
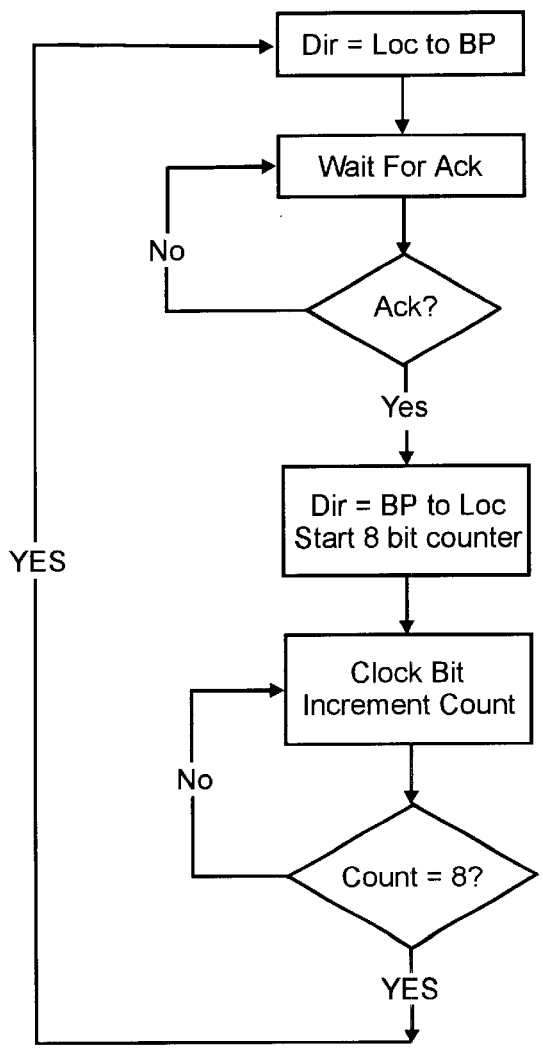
FIG. 8 shows a state machine flow chart for a write transaction.
Figure 9:
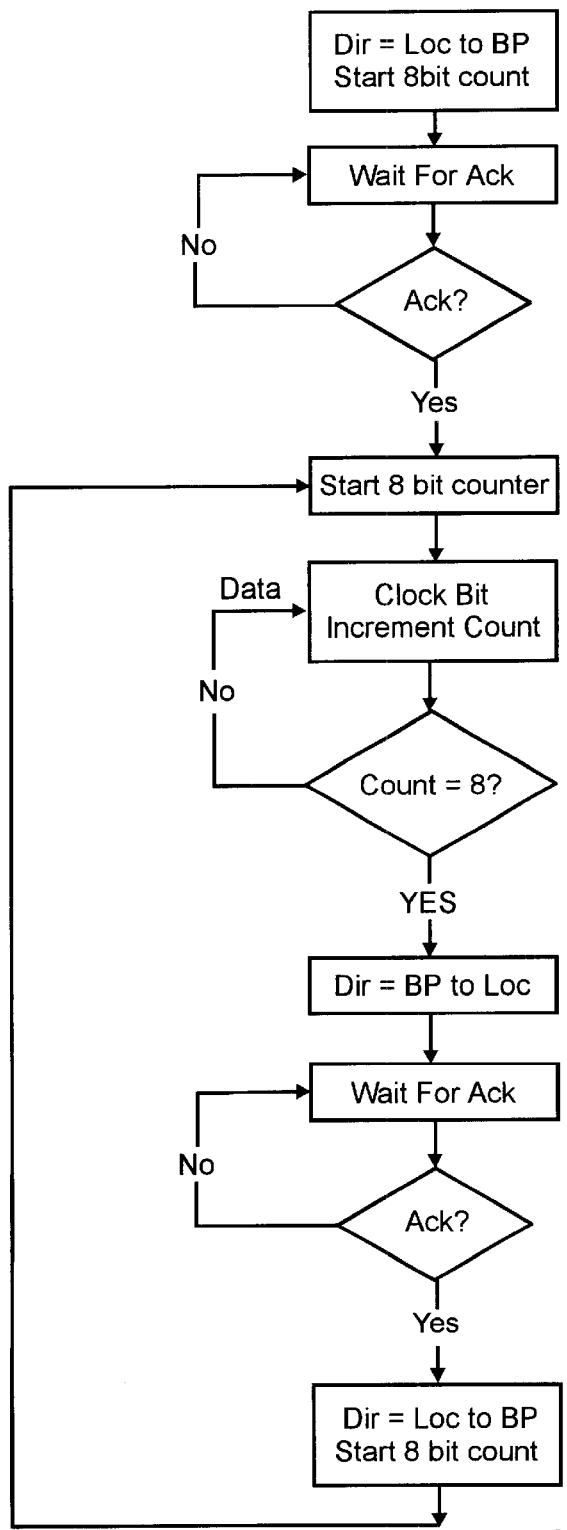
FIG. 9 shows a state machine flow chart for a read transaction.

The Read/Write Detection 54 implements processes to handle read and write transactions from the communication bus. As discussed in herein, FIGS. 8 and 9 show exemplary process for read and write transactions that can be implemented by the Read/Write Detection 54.

Figure 10:
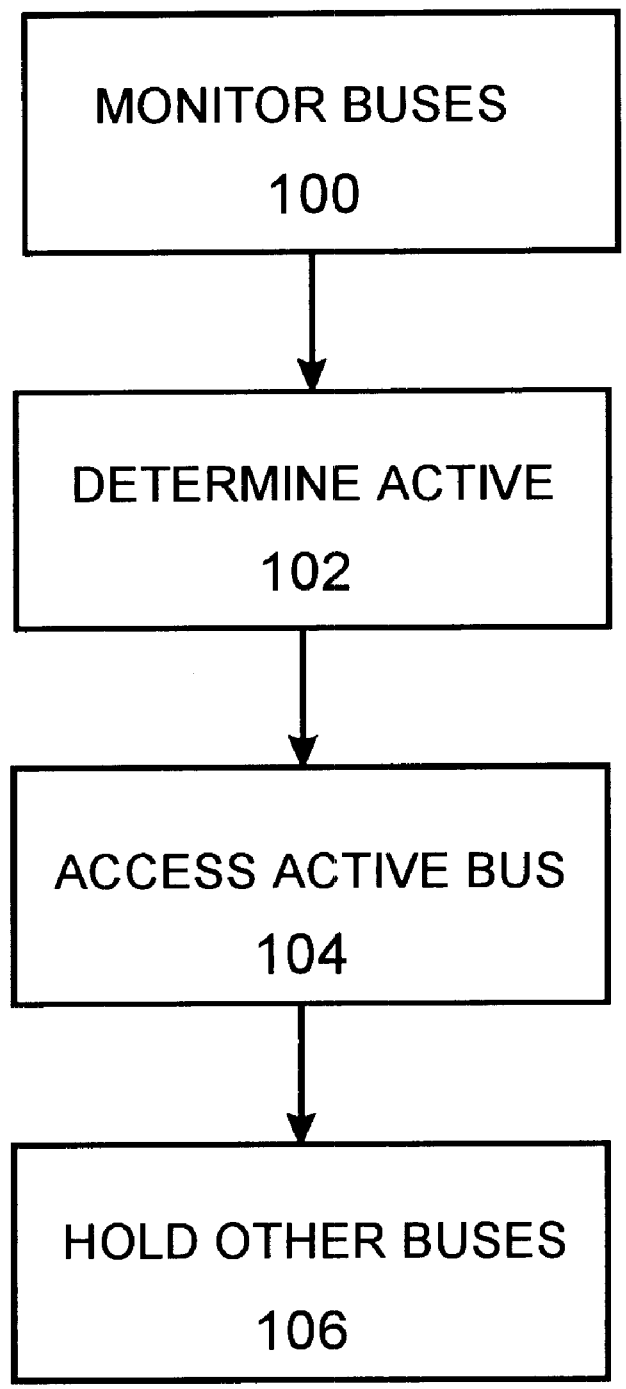
FIG. 10 shows a simplified flow chart diagram of the operation of an arbiter of an application card shown in FIG. 2.

An exemplary Read/Write State Machine 54 processes the reads and writes to and from the appropriate communication bus as determined from the Start/Stop Detection 52. FIGS. 9 and 10 show the illustrative flow charts of the Read/Write State Machine 54. It will be appreciated by those skilled in the art that the can implement the flow charts with a logic state machine using combinational logic. A stop condition on either communication bus resets the control state machine 56.

It should be understood that the arbiter 50 can use a variety of procedures to select between the plurality of communication buses. FIG. 10 shows a general method that can be utilized by the arbiter 50 to select the appropriate communication bus to interface to the application card 20. At Step 100, the arbiter 50 monitors the plurality of communication buses to determine if a communication buses has become active with data from a management card. At Step 102, an active communication bus can be determined in any variety of ways well known to those skilled in the art including monitoring protocols sent on the communication buses.

At Step 104, the active communication bus is allowed access to the application card by connecting or switching the active communication bus to the local bus of the application card. The access to the local card can be provided by a switching function device implemented through an integrated switching matrix, a simple decoder or other solid state integrated circuit. At Step 106, the arbiter prevents the other communication buses from accessing the application card to prevent possible conflicts and contention between the buses.

Because the I²C-bus is bi-directional, the arbiter also preferably includes knowledge of the I²C protocol to appropriately switch the bus direction as described above.

Alternatively, the arbiter may select among a plurality of communication buses according to a programmed algorithm or other criteria. A priority can be assigned to communication buses and the priority of the communication bus used to selected the appropriate communication bus to allow access to the application card. A priority can also be utilized to allow a communication bus to preempt communication buses of lower priority. Communication buses may be assigned to classes in which certain classes are allowed simultaneous access to the application card and other classes of communication buses access the card mutually exclusively. The management card may download updated priority scheme to the arbiter over to the I²C-bus. Using the arbiter, any arbitrary scheme for selecting among a plurality of communication buses may be implemented and tailored and modified according to the needs of the particular device.

Those skilled in the art will recognize that the bus arbiter and methods disclosed herein provides have many different uses and provides many advantages for allowing multiple access to electronic circuit cards. By resolving potential contention between multiple communication buses accessing a device the present embodiment has many applications beyond implementing redundancy within a communication card chassis as disclosed for illustrative purposes herein. For example, the present invention can be utilized whenever multiple access to an electronic circuit card or device is regulated.

The present embodiment preferably includes logic to implement the described methods in software modules as a set of computer executable software instructions. The Computer Processing Unit ("CPU") or microprocessor implements the logic that controls the operation of the channel card. The microprocessor executes software that can be programmed by those of skill in the art to provide the described functionality. The software can be represent as a sequence of binary bits maintained on a computer readable medium including magnetic disks, optical disks, organic disks, and any other volatile or (e.g., Random Access Memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described in further detail below.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry. Preferably, the present embodiment is embodied as a Programmable Logic Device.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. An electronic application card performing communication functions, the application card comprising:
    a plurality of physical communication buses accessing the application card, wherein the physical communication buses have mutually exclusive access to the application card;
    a physical interface switch interfaced to the plurality of communication buses, the physical interface switch monitoring the plurality of physical buses and selecting between a plurality of physical buses accessing the application card; and
    a criterion to determine the appropriate physical bus to allow mutually exclusive access to the application card, the criterion determined at least in part by the monitoring of the plurality of physical buses by the application card.

2. The invention of claim 1 wherein the plurality of physical communication buses comprises 10-Base-2 Ethernet buses.

3. The invention of claim 1 wherein the plurality of physical communication buses carry management information to the equipment card.

4. The invention of claim 1 wherein the criterion comprises a flag bit.

5. The invention of claim 4 wherein the flag bit is carried by another communication bus.

6. The invention of claim 5 wherein the other communication bus comprises an $I^2C$-bus.

7. The invention of claim 5 further comprising an expander to provide the flag bit from the communication bus.

8. An equipment card chassis for containing a plurality of application cards comprising:
    a plurality of communication buses for transmitting information between application cards;
    a plurality of application cards, each of the application cards having more than one of the plurality of communication buses accessing the application card, each application card comprising:
        a physical interface switch to select between the plurality of communication buses; and
    a criterion to determine which of the plurality of buses has access to the application card.

9. The invention of claim 8 wherein the physical interface switch selects between the plurality of communication buses based on the criterion.

10. The invention of claim 8 wherein the equipment card chassis comprises a management functions equipment card that communicates to the application card over the plurality of communication buses.

11. The invention of claim 10 wherein the management functions equipment card communicates over only one of the plurality of communication buses.

12. An electronic circuit card accessed by a plurality of communication buses, the circuit card comprising:
    a first communication bus accessing the electronic circuit card;
    a second communication bus accessing the electronic circuit card;
    wherein said first communication bus and said second communication bus require mutually exclusive access to the circuit card; and
    a third communication bus, wherein the third communication bus provides a criterion to determine between which of the first and second communication bus has access to the electronic circuit card.

13. The invention of claim 12 wherein the criterion comprises a flag bit.

14. The invention of claim 12 wherein the criterion comprises a flag byte.

15. The invention of claim 12 wherein the first and second communication buses comprise an Ethernet bus.

16. The invention of claim 12 wherein the third communication bus comprises an $I^2C$-bus.

* * * * *